May 14, 1957  R. E. J. NORDQUIST ET AL  2,791,978
STOPPING MECHANISM FOR CAN BODY MAKING MACHINE
Filed June 8, 1953  3 Sheets-Sheet 2

INVENTORS
RONALD E. J. NORDQUIST
NELSON GEERTSEN
BY Charles H. Erne
Leland R. McCann
George W. Reiber
ATTORNEYS May 14, 1957 R. E. J. NORDQUIST ET AL 2,791,978
STOPPING MECHANISM FOR CAN BODY MAKING MACHINE
Filed June 8, 1953 3 Sheets-Sheet 3
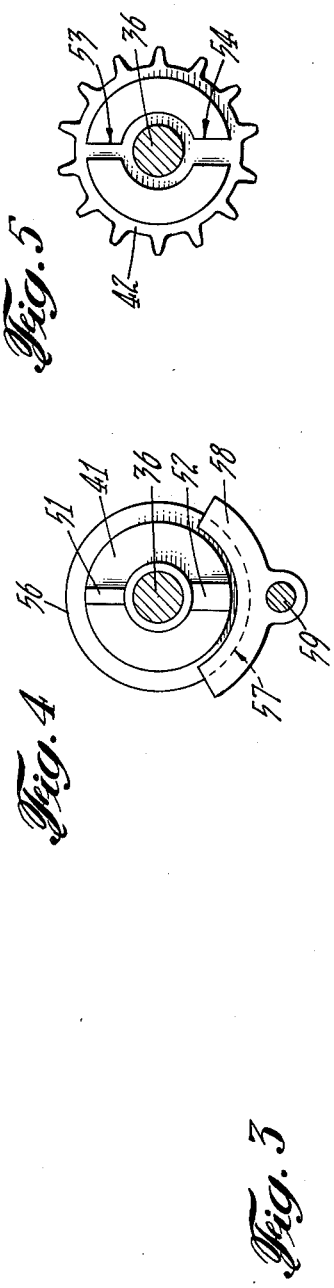
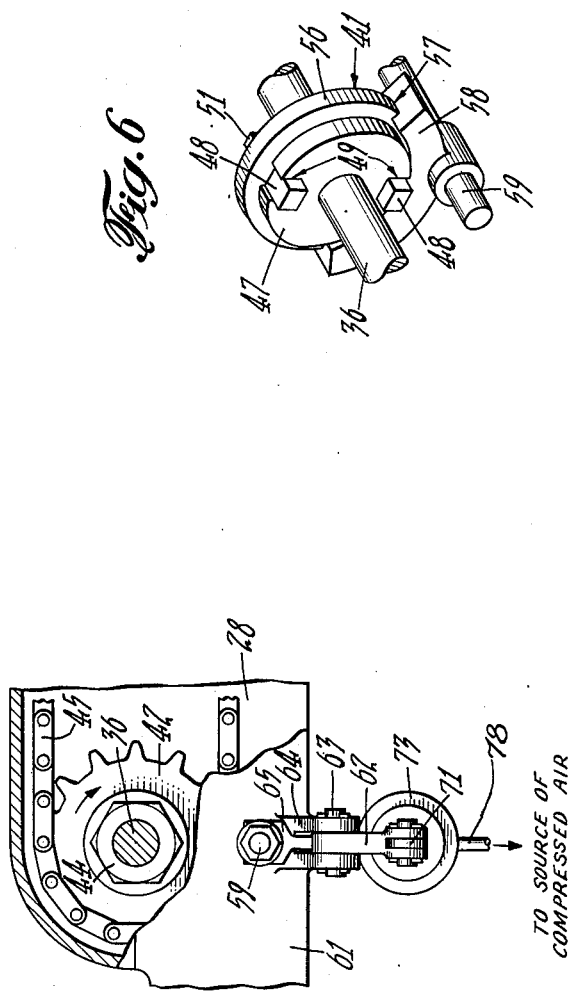
INVENTORS
RONALD E. J. NORDQUIST
NELSON GEERTSEN
BY *Charles H. Bine*
*Leland R. McCann*
*George W. Reiber*
ATTORNEYS United States Patent Office 2,791,978
Patented May 14, 1957

2,791,978

STOPPING MECHANISM FOR CAN BODY MAKING MACHINE

Ronald E. J. Nordquist, Maplewood, N. J., and Nelson Geertsen, Oak Park, Ill., assignors to American Can Company, New York, N. Y., a corporation of New Jersey Application June 8, 1953, Serial No. 360,126

11 Claims. (Cl. 113—10)

The present invention constitutes an important improvement in machines for forming and soldering sheet metal can bodies in which the bodies are propelled in timed order along a predetermined path of travel by a delivery mechanism heretofore subject to untimed stoppage which upon such stoppage leaves a can body in an intermediate position relative to a constantly operating receiving mechanism. The invention has particular reference to devices for stopping the delivery mechanism in a predetermined position in its cycle of operation irrespective of its position at the initiation of the stopping phase to insure accurate placing of a can body in the receiving mechanism.

In the manufacture of sheet metal can bodies which require a side seam soldering operation it is customary to form the body in a forming section of a can body making machine and to effect the soldering operation in a soldering section. These two sections are connected by an extension of the forming mandrel of the forming section of the machine and the bodies, as they are formed, are propelled along the mandrel by feeding devices which advance them in timed order and deliver them into a feeding device of the soldering section of the machine.

The soldering of can bodies involves high heat and because of this the soldering section is a continuously operating mechanism, while the forming section is subject to frequent stops by reason of jams and other abnormal causes. When the forming section stops, it leaves the most advanced can body on the mandrel in an indeterminate position which usually is a partially advanced position improperly placed relative to the receiving mechanism of the soldering machine section where it is liable to be wrecked and to cause damage to the receiving mechanism of the machine.

The instant invention contemplates overcoming this difficulty by mechanism which controls the feeding devices of the forming section of the machine (bodymaker) and which operates to effect accurate stoppage of the feeding devices in such a manner that the last (most advanced) can body will always be fully advanced into proper alignment for the receiving mechanism before the feeding devices stop.

An object, therefore, of the invention is the provision of a can body making and soldering machine having a delivery feed mechanism subject to untimed stoppage and a receiving feed mechanism continuously operating wherein the delivery feed mechanism is controlled to stop only at a predetermined point in its cycle of operation after full advancement of a can body to insure proper placing of the can body in the receiving mechanism.

Numerous other objects and advantages of the invention will be apparent as it is better understood from the following description, which, taken in connection with the accompanying drawings, discloses a preferred embodiment thereof.

Referring to the drawings.

Figure 2:
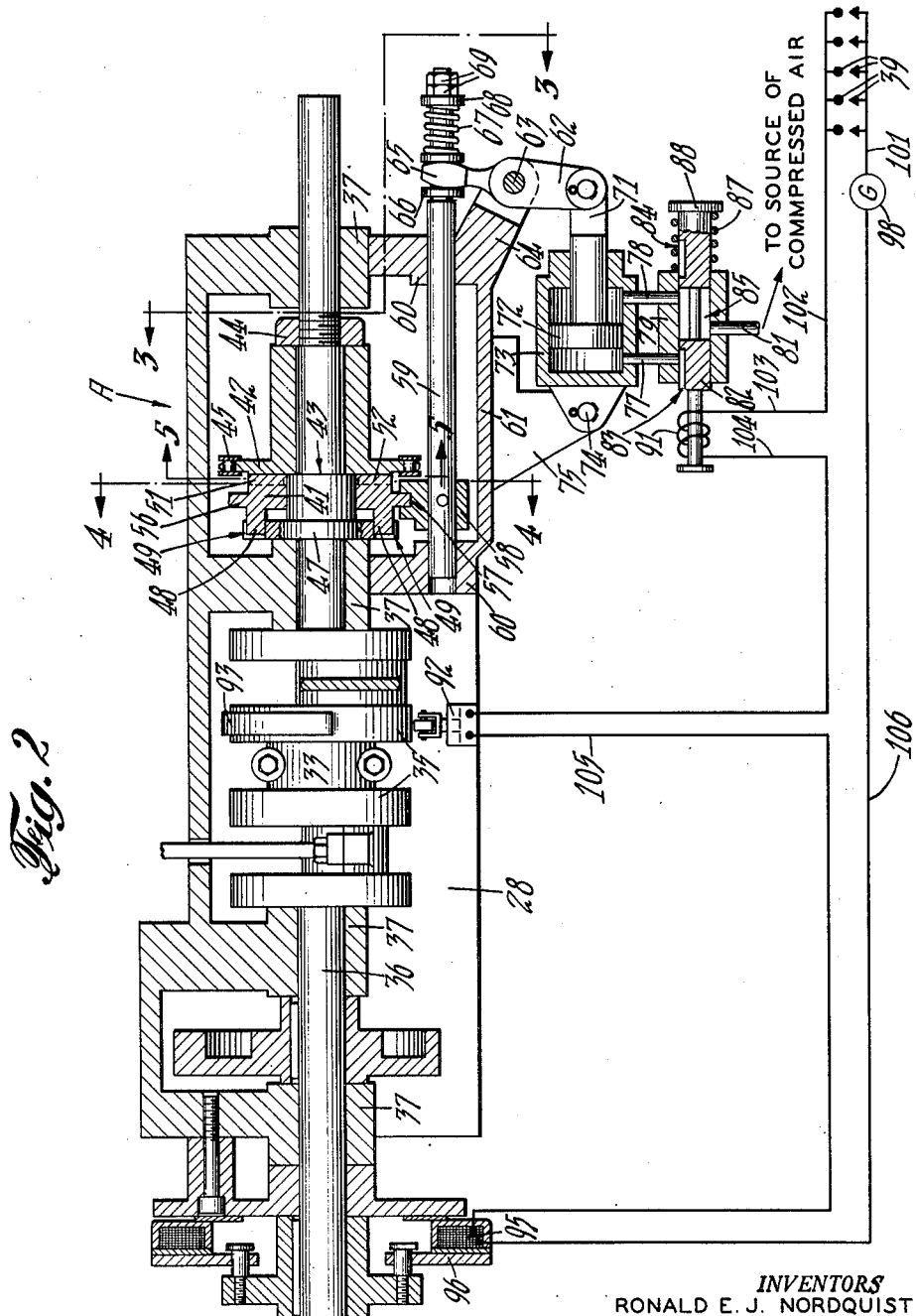
Fig. 2 is a transverse sectional view taken substantially along the line 2—2 in Fig. 1, the view also including a wiring diagram of an electric circuit used in the machine.

Figs. 3, 4 and 5 are end sectional views taken substantially along the respective lines 3—3, 4—4 and 5—5 in Fig. 2, with parts broken away; and Fig. 6 is a perspective view of the parts shown in Fig. 4, with parts broken away.

Figure 1:
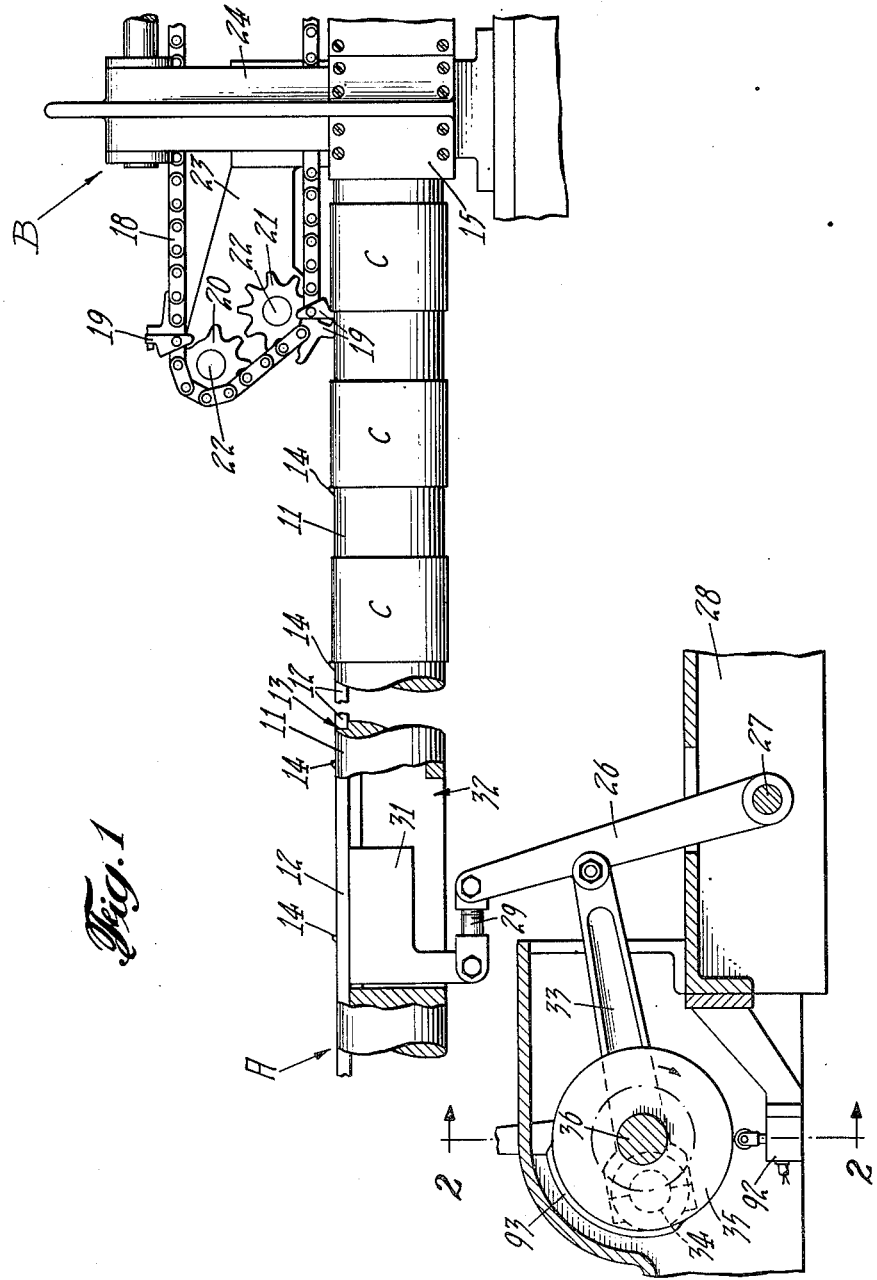
Figure 1 is a side elevation of principal parts of a can body making machine embodying the instant invention, with parts broken away and a procession of can bodies passing through the machine.

As a preferred or exemplary embodiment of the instant invention the drawings illustrate principal parts of a delivery feed mechanism (Fig. 1) of a forming section A of a can body making machine and a receiving feed mechanism of a soldering section B of a side seam soldering machine customarily used with the bodymaker as a unitary extension thereof to provide for complete manufacture of can bodies C. These machines are of the character respectively disclosed in United States Patent 1,770,041, issued July 8, 1930, to John F. Peters on Roll Bodymaker, and United States Patent 1,338,716, issued May 4, 1920, to M. E. Widell on Soldering Machine.

In such a can body making and soldering machine the can bodies C are properly shaped and prepared for soldering during advancement along an inside mandrel or horn 11 (Fig. 1) which forms a part of the forming section A of the body making machine. Advancement of the bodies along the horn 11 is effected in an intermittent or step-by-step manner, preferably by a reciprocating feed bar 12 located in a longitudinal groove 13 in the mandrel 11. The feed bar 12 is provided with spaced spring pressed retractable feed dogs 14 for engagement behind the can bodies.

The inside mandrel 11 extends beyond the forming section A of the body making machine and connects with the receiving or entrance end of an outside horse 15 which is a part of the soldering machine B and which provides for continued guidance of the bodies C through the soldering machine. The bodies C are propelled through this outside horse 15 by a continuously moving endless chain conveyor 18 (Fig. 1) having gripper dogs 19 spaced at equal intervals along the chain and which travel along the top of the horse.

At the receiving end of the horse 15 the conveyor 18 operates over a pair of vertically spaced idler sprockets 20, 21 mounted on shafts 22 journaled in a bearing bracket 23 which extends out from a frame 24 which constitutes the main frame of the soldering machine B. The conveyor 18 is continuously operated in any suitable manner, preferably by connection with the bodymaker A as disclosed in the above mentioned Widell patent, so that the conveyor operates in timed relation with the bodymaker.

The can bodies C produced in the forming section A of the bodymaker, as they are advanced in a step-by-step manner along the mandrel 11 by the reciprocating feed bar 12 are continued in this advancement along the extension of the mandrel 11 to a transfer station at the entrance end of the soldering machine conveyor 18 for transfer thereto and continued advancement through the outside horse 15. For this purpose the feed bar 12 is reciprocated through a feeding stroke toward the soldering machine conveyor 18 and thence through a back or return stroke in time with the advancement of the gripper dogs 19 on the conveyor 18. This reciprocating movement is effected by a rocker arm 26 which is mounted on a pivot pin 27 carried in a frame 28 which constitutes the main frame of the bodymaker A. The arm 26 extends upwardly and at its upper end is pivotally connected by a short link 29 to a bracket 31 attached to the feed bar 12. The bracket 31 operates in a clearance opening 32 in the mandrel 11.

The rocker arm 26 is oscillated on its pivot pin 27 by a pitman 33 (see also Fig. 2) which at one end is connected to the rocker arm intermediate its ends. The opposite end of the pitman 33 is connected to a crank pin 34 secured in a pair of spaced crank discs 35 of a crank shaft 36 extending transversely of the bodymaker and journaled in bearings 37 formed in the bodymaker frame 28. In the usual bodymaker, the crank shaft 36 is provided with additional crank discs and cranks which actuate the body blank and the notching devices.

Under normal conditions the crank shaft 36 is rotated continuously and upon each complete revolution the shaft rocks the rocker arm 26 through one complete cycle of operation and thus reciprocates the feed bar 12 through a full feeding stroke and a full return stroke. On the feeding stroke all can bodies in the bodymaker are advanced in timed order one step along the inside mandrel 11 and the last or most advanced body is fed into the transfer station in proper position relative to the soldering machine conveyor 18 so that a set of the gripper dogs 19 on the conveyer will readily move in behind the properly placed body and pick it up for continued advancement through the outside horse 15 of the soldering machine.

Under abnormal conditions as when a can body advancing along the bodymaker mandrel 11 becomes jammed or when a double body blank is fed or for other abnormal reasons, it has been customary to stop operation of the bodymaker entirely and immediately. An electric stop system which includes numerous normally open electric switches 39 indicated in the wiring diagram in Fig. 2 and fully explained in the above mentioned Peters patent, is usually provided at all stations in the bodymaker so that closing of any one of the switches stops the machine. In such a machine the feed bar 12 stops anywhere in an indeterminate position and thus stops the last or most advanced can body in a position out of alignment relative to the soldering machine conveyor 18. Usually an auxiliary feed device is utilized to advance the last can body into its proper place. Such an auxiliary device is shown in United States Patent No. 2,374,694, issued May 1, 1945, to J. H. Murch on Feeding Device.

In the instant invention the auxiliary feed device is eliminated and provision is made to stop feeding of bodies and blanks to be made into bodies, through the bodymaker while the remainder of the machine keeps operating. The stoppage of the feeding however is effected only after the last can body has been fully advanced into the transfer station and is in proper position relative to the soldering machine conveyor 18 and the reciprocating feed bar 12 is moving through a return stroke. In this manner the last can body is always properly placed so that damage to the body and the machine is prevented.

To effect this timed stopping of the reciprocating feed bar 12, its actuating crank shaft 36 is rotated through a clutch ring 41 (Figs. 2, 4 and 6) which is controlled by the stop switches 39 and which is engageable with a continuously rotating drive sprocket 42 (Figs. 2, 3 and 5) loosely mounted on the crank shaft 36. The drive sprocket 42 is restrained against endwise movement along the shaft by a shoulder 43 (Fig. 2) on the shaft and a nut 44 threadedly secured to the shaft. The sprocket 42 is continuously rotated by an endless chain 45 (Figs. 2 and 3) which is driven from the main shaft of the bodymaker as shown in the Peters patent above mentioned.

The clutch ring 41 is slideably mounted on the crank shaft 36 and is interposed between the driving sprocket 42 and a collar 47 (Figs. 2 and 6) formed on the crank shaft. Two diametrically disposed lugs 48 project from one face of the clutch ring 41 and slideably engage in a cooperating pair of notches 49 formed in the edge of the collar 47 and thus provide for driving the crank shaft through rotation of the clutch ring. The face of the clutch ring adjacent the sprocket 42 is formed with a pair of radially disposed driving teeth 51, 52 (Figs. 2 and 4) of different widths which are adapted to engage in cooperating recesses 53, 54 (Figs. 2 and 5) formed in the face of the sprocket to effect rotation of the clutch ring 41 and the sprocket 42 in unison. The tooth 51 and recess 53 are of the same width and the tooth 52 and recess 54 are of the same width but the latter are wider than the former so that the teeth and recesses will only intermesh in one way so that the crank shaft 41 will always be in proper time with the sprocket and the other moving parts of the bodymaker each time the clutch ring 41 is re-engaged with the sprocket 42 after a disengagement.

When the clutch ring 41 is engaged with the sprocket 42, the sprocket rotates the clutch ring and the crank shaft 36 connected thereto through the collar 47, and thus rocks the rocker arm 26 which reciprocates the feed bar 12. When the clutch ring 41 is disconnected from the sprocket, the sprocket continues to rotate but the crank shaft 36 stops thus stopping the reciprocation of the feed bar 12.

Clutching and declutching of the clutch ring 41 with the sprocket 42 is effected by sliding the clutch ring along the crank shaft. For this purpose, the outer periphery of the clutch ring 41 is formed with an annular projecting tongue 56 (Figs. 2, 4 and 6) which operates in a groove 57 formed in a yoke 58 secured to a slide rod 59 disposed adjacent and parallel with the crank shaft 36. The rod 59 is slideably carried in a pair of spaced bearings 60 formed in a bracket 61 attached to and depending from a pair of the crank shaft bearings 37.

The slide rod 59 is shifted in its bearings 60 by a lever 62 (Figs. 2 and 3) mounted on a pivot pin 63 secured in a lug 64 which extends out from the bearing bracket 61. The upper end of the lever is formed with a fork 65 which is interposed between a collar 66 formed on the slide rod 59 and a compression spring 67 which surrounds the outer end of the rod and is held in place by a washer 68 and lock nuts 69. At its lower end the lever 62 is connected to a piston rod 71 having a piston 72 located within a cylinder 73 carried on a pivot pin 74 secured in lugs 75 formed on the bearing bracket 61.

The piston is reciprocated within the cylinder 73 preferably by compressed air admitted into the cylinder by way of air lines 77, 78 connecting the interior of the cylinder adjacent its ends with the interior of a slide valve housing 79 (Fig. 2). Opposite the ends of the air lines 77, 78 the valve housing 79 is connected to an inlet pipe 81 which leads from any suitable source of supply of compressed air or other fluid. Between the air lines 77, 78 and the inlet pipe 81 the valve housing carries a slide valve 82 which extends through the housing and projects beyond both of its ends. Adjacent the air lines 77, 78 the slide valve 82 is provided with vent channels 83, 84 which communicate with the outside atmosphere for venting the cylinder. Intermediate the vent channels the slide valve is formed with a relatively wide annular groove 85.

Movement of the slide valve 82 in its housing 79 is effected in one direction (toward the right in Fig. 2) by a compression spring 87 which surrounds the portion of the valve outside the housing and is interposed between the end of the housing and a head 88 formed on the valve. Movement of the slide valve 82 in the opposite direction (toward the left in Fig. 2) is effected by energizing a normally de-energized electric solenoid 91 which surrounds the portion of the valve extending beyond this end of the housing.

The compression spring 87 normally retains the slide valve 82 in the position shown in Fig. 2 which permits of communication between the inlet pipe 81 and the air line 78 and thus provides for the flow of compressed air into the cylinder 73 in front of the piston 72 where it exerts a force against the piston to keep it in a position (at the left as viewed in Fig. 2) to maintain the clutch ring 41 engaged with the sprocket 42 and thus provide for continuous operation of the feed bar 12 for the progressive advancement of the can bodies along the mandrel 11.

When an abnormal condition arises in the machine and closes one of the normally open stop switches 39, the electric solenoid 91 is energized and the slide valve 82 is thus shifted in its housing 79 to the left as viewed in Fig. 2, and against the resistance of the spring 87 to vent the air line 78 through valve channel 84 and open communication between the air line 77 and the inlet pipe 81. This action vents the cylinder 73 in front of the piston 72 and permits the air to flow into the cylinder in back of the piston and thus pushes the piston toward the right as viewed in Fig. 2. This movement of the piston rocks the lever 62 in a counterclockwise direction and thus disengages the clutch ring 41 from the driving sprocket 42 so as to stop rotation of the crank shaft 36 and reciprocation of the feed bar 12.

However, provision is made to delay the energizing of the electric solenoid 91 and shifting of the slide valve 81 until the feed bar 12 has completed its feeding stroke to properly place the last can body on the mandrel 11 and starts back on its return stroke. This delaying action is effected by a normally open electric timing switch 92 which is closed at the beginning of each return stroke of the feed bar 12, by an edge cam lug 93 (Figs. 1 and 2) formed in the proper place on the periphery of one of the crank discs 35. The length of the cam lug 93 is sufficient to hold the switch 92 closed for slightly more than one half of the full return stroke of the feed bar 12. It is only when this timing switch 92 and one of the stop switches 39 are held closed that the solenoid 91 can be energized. When both of these switches are closed, the slide valve 82 is shifted as above mentioned on the back stroke of the feed bar 12 and the clutch ring 41 and driving sprocket 42 are immediately disengaged.

In order to stop the crank shaft 36 immediately upon disengagement of the clutch ring 41 from the sprocket 42, a braking device is utilized on the shaft. Although any kind of a brake may be used, a preferred form shown in the drawings comprises an electric brake of the character disclosed in United States Patent 2,507,573, issued May 16, 1950, to John G. Oetzel on Electromagnetic Friction Device. Such a device comprises a stationary normally de-energized electromagnet 95 (Fig. 2) which surrounds the crank shaft 36 and is secured to the bodymaker frame 28. Adjacent the outer face of the magnet in spaced relation thereto is a rotatable armature disc 96 which is secured to and rotates with the crank shaft 36. When the electromagnet 95 is energized it attracts the armature disc 96 and instantly stops the disc and the crank shaft 36 secured thereto.

Energizing and de-energizing of the slide valve solenoid 91 and the brake electromagnet 95 is effected simultaneously through an electric circuit which includes these elements, the stop switches 39, the timing switch 92 and a suitable source of electric current such as a generator 98 (Fig. 2). For this purpose the stop switches 39 are connected in parallel by a pair of lead lines 101, 102 while the other elements are connected in series with these lead lines. Hence by reference to the wiring diagram in Fig. 2 it will be seen that when one of the stop switches 39 and the timing switch 92 are closed, electric current from the generator 98 flows along the lead line 101, through the closed stop switch 39, along lead wire 102, a connecting wire 103, slide valve solenoid 91, a connecting wire 104, closed timing switch 92, a wire 105 to and through the brake electro-magnet 95, and thence returning along a wire 106 to the generator.

Electric current flowing along this circuit immediately energizes the slide valve solenoid 91 and the brake electromagnet 95 and thus stops the crank shaft 36 and the reciprocating feed bar 12 on the back or return stroke of the feed bar. The shaft and bar will remain stopped until the abnormal condition in the bodymaker is re- moved and the closed stop switch 39 reopened. Opening of this switch immediately breaks the circuit even though the timing switch 92 remains temporarily closed and de-energizes the solenoid 91 and the brake magnet 95. Hence, the brake is released and the clutch ring 41 is re-engaged with the sprocket 42 when the teeth 51, 52 on the ring register with and engage in the recesses 53, 54 on the sprocket, and thus the sprocket picks up the clutch ring in its proper timing and operates the crank shaft 36 and reciprocating feed bar 12 in time with the other parts of the bodymaker.

Hence the stopping of the feed bar 12 is always effected on its return stroke with the result that the feed bar will always complete its feeding stroke before stopping and thus always properly locates the last or most advanced can body C on the mandrel 11 in relation to the soldering machine conveyor 18 for proper reception by the gripper dogs 19 on the conveyor.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

We claim:

1. In a machine for making can bodies, the combination of a reciprocatory delivery feed mechanism operating through a feeding stroke and a return stroke for propelling can bodies along a predetermined path of travel and for normally delivering the bodies directly to a predetermined station, a continuously operating receiving feed mechanism for picking up said bodies at said station for further advancement, and means responsive to abnormal feeding conditions for stopping said delivery feed mechanism only on a said return stroke thereof to insure full advancement by said delivery feed mechanism of a said can body so that the body will be left in proper position at said station for engagement by said receiving feed mechanism when said delivery feed mechanism is stopped under abnormal feeding conditions.

2. In a machine for making can bodies, the combination of a reciprocatory delivery feed mechanism operating through a feeding stroke and a return stroke for propelling can bodies along a predetermined path of travel and for normally delivering the bodies directly to a predetermined station, a continuously operating receiving feed mechanism for picking up said bodies at said station for further advancement, and means responsive to abnormal feeding conditions and including a clutch mechanism for stopping said delivery feed mechanism only on a said return stroke thereof to insure full advancement by said delivery feed mechanism of a said can body so that the body will be left in proper position at said station for engagement by said receiving feed mechanism when said delivery feed mechanism is stopped under abnormal feeding conditions.

3. In a machine for making can bodies, the combination of a reciprocatory delivery feed mechanism operating through a feeding stroke and a return stroke for propelling can bodies along a predetermined path of travel and for normally delivering the bodies directly to a predetermined station, a continuously operating receiving feed mechanism for picking up said bodies at said station for further advancement, and means responsive to abnormal feeding conditions and including a clutch mechanism and a brake mechanism for stopping said delivery feed mechanism only on a said return stroke thereof to insure full advancement by said delivery feed mechanism of a said can body so that the body will be left in proper position at said station for engagement by said receiving feed mechanism when said delivery feed mechanism is stopped under abnormal feeding conditions.

4. In a machine for making can bodies, the combination of a reciprocatory delivery feed dog for propelling a can body along a predetermined path of travel and for normally delivering the can body into a proper forward position at a predetermined station, actuating means for reciprocating said feed dog through a feeding stroke and a return stroke, a continuously operating receiving feed mechanism including a gripper dog for picking up a properly positioned can body at said station for further advancement, and means responsive to abnormal feeding conditions for stopping said actuating means and delivery feed dog only on a return stroke thereof to insure full advancement by said delivery feed dog of a said can body so that the body will be left in its proper forward position at said station for engagement by a said gripper dog when said delivery feed dog is stopped under abnormal feeding conditions.

5. In a machine for making can bodies, the combination of a reciprocatory delivery feed bar having a plurality of spaced feed dogs thereon for propelling can bodies intermittently along a predetermined path of travel and for normally delivering the bodies individually into a proper forward position at a predetermined station, actuating means for reciprocating said feed bar through a feeding stroke and a return stroke, a continuously operating receiving feed mechanism for picking up properly positioned can bodies at said station for further advancement, and means responsive to abnormal feeding conditions for stopping said feed bar only on a said return stroke thereof to insure full advancement by a said feed dog of a said can body entering said station so that the body will be left in its proper forward position at said station for proper engagement by said receiving feed mechanism when said delivery feed bar is stopped under abnormal feeding conditions.

6. In a machine for making can bodies, the combination of a reciprocatory delivery feed dog for propelling a can body along a predetermined path of travel and for normally delivering the can body into a proper forwarding position at a predetermined station, actuating means including a rotatable shaft and shaft driving means for reciprocating said feed dog through a feeding stroke and a return stroke, a continuously operating receiving feed mechanism for picking up a properly positioned can body at said station for further advancement, and means responsive to abnormal feeding conditions and including a clutch mechanism interposed between said rotatable shaft and said shaft driving means for disconnecting said shaft from its driving means and for stopping said actuating means and delivery feed dog only on a return stroke thereof to insure full advancement by said feed dog of a said can body so that the body will be left in its proper forwarding position at said station for reception by said receiving feed mechanism when said delivery feed dog is stopped under abnormal feeding conditions.

7. In a machine for making can bodies, the combination of a reciprocatory delivery feed dog for propelling a can body along a predetermined path of travel and for normally delivering the can body into a proper forwarding position at a predetermined station, actuating means including a rotatable shaft and shaft driving means for reciprocating said feed dog through a feeding stroke and a return stroke, a continuously operating receiving feed mechanism for picking up a properly positioned can body at said station for further advancement, and means responsive to abnormal feeding conditions and including a clutch mechanism interposed between said rotatable shaft and said shaft driving means and further including a brake on said shaft for disconnecting said shaft from its driving means and for stopping said actuating means and feed dog only on a return stroke thereof to insure full advancement by said feed dog of a said can body so that the body will be left in its proper forwarding position at said station for reception by said receiving feed mechanism when said delivery feed dog is stopped under abnormal feeding conditions.

8. In a machine for making can bodies, the combination of a reciprocatory delivery feed dog for propelling a can body along a predetermined path of travel and for normally delivering the can body into a proper forwarding position at a predetermined station, a continuously operating receiving feed mechanism for picking up a properly positioned can body at said station for further advancement, a rotatable shaft for reciprocating said feed dog through a feeding stroke and a return stroke, driving means for rotating said shaft, a clutch mechanism interposed between said shaft and said driving means, a normally released brake on said shaft, and means responsive to abnormal feeding conditions for actuating said clutch mechanism and said brake simultaneously for stopping said feed dog only on a return stroke thereof to insure full advancement by said feed dog of a said can body so that the body will be left in its proper forwarding position at said station for reception by said receiving feed mechanism when said delivery feed dog is stopped under abnormal feeding conditions.

9. In a machine for making can bodies, the combination of a reciprocatory delivery feed dog for propelling a can body along a predetermined path of travel and for normally delivering the can body into a proper forwarding position at a predetermined station, a continuously operating receiving feed mechanism for picking up a properly positioned can body at said station for further advancement, a rotatable shaft for reciprocating said feed dog through a feeding stroke and a return stroke, driving means for rotating said shaft, a clutch mechanism interposed between said shaft and said driving means, a normally released brake on said shaft, actuating means for operating said clutch mechanism and said brake to stop reciprocation of said feed dog under abnormal feeding conditions, and timing means effective on said actuating means for stopping said feed dog only on a return stroke thereof to insure full advancement of a said can body so that it will be left in its proper forwarding position at said station for reception by said receiving feed mechanism when said delivery feed dog is stopped under abnormal feeding conditions.

10. In a machine for making can bodies, the combination of a reciprocatory delivery feed dog for propelling a can body along a predetermined path of travel and for normally delivering the can body into a proper forwarding position at a predetermined station, a continuously operating receiving feed mechanism for picking up a properly positioned can body at said station for further advancement, a rotatable shaft for reciprocating said feed dog through a feeding stroke and a return stroke, driving means for rotating said shaft, a clutch mechanism interposed between said shaft and said driving means, a normally released brake on said shaft, electric means including an electric control circuit and electric stop devices operable by the can bodies moving through the machine for controlling the operation of said clutch mechanism and said brake to stop reciprocation of said feed dog under abnormal feeding conditions, and electric timing means effective on said circuit to time the operation of said clutch mechanism and said brake for stopping said feed dog on the return stroke thereof to insure full advancement by said feed dog of a said can body so that the body will be left in its proper forwarding position at said station for reception by said receiving feed mechanism when said delivery feed dog is stopped under abnormal feeding conditions.

11. In a machine for making can bodies, the combination of a forming mechanism including a reciprocating feed dog for delivering a can body therefrom on a forward stroke thereof, a soldering mechanism including a continuously operating feed conveyor having a gripper dog for receiving said can body from said reciprocating feed dog on its forward stroke and for advancing the body through said soldering mechanism, and means for stopping said reciprocating feed dog only on a return stroke thereof and without affecting the continuous operation of said gripper dog to insure full advancement by said feed dog of said can body into the grip of said gripper dog and thereby leaving said can body in accurate alignment with said gripper dog when said feed dog is stopped.

References Cited in the file of this patent

UNITED STATES PATENTS

| | | |
|---|---|---|
| 1,770,041 | Peters | July 8, 1930 |
| 1,773,277 | Peters | Aug. 19, 1930 |
| 2,203,403 | Cameron | June 4, 1940 |
| 2,269,517 | Burton | Jan. 13, 1942 |
| 2,374,694 | Mursh | May 1, 1945 |